United States Patent
Ramos (10) Patent No.: US 7,634,168 B2
(45) Date of Patent: Dec. 15, 2009

(54) APPARATUS AND METHOD FOR FORMING AN OPTICAL FIBER DEVICE

(75) Inventor: Rogerio Ramos, Hampshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/775,003

(22) Filed: Jul. 9, 2007

(65) Prior Publication Data

US 2008/0008420 A1    Jan. 10, 2008

(30) Foreign Application Priority Data

Jul. 10, 2006    (GB)    ................... 0613721.0

(51) Int. Cl.
*G02B 6/00*    (2006.01)

(52) U.S. Cl. .................... 385/147; 385/95; 385/96; 385/123

(58) Field of Classification Search ............... 385/147, 385/95, 96, 123
See application file for complete search history.

(56) References Cited

U.S. PATENT DOCUMENTS

| | | |
|---|---|---|
| 6,349,572 B1 | 2/2002 | Meinl et al. |
| 7,052,185 B2 | 5/2006 | Rubino et al. |
| 7,104,324 B2 | 9/2006 | Wetzel et al. |
| 7,222,676 B2 | 5/2007 | Patel et al. |
| 7,235,743 B2 | 6/2007 | Varkey |
| 2001/0045108 A1 | 11/2001 | Steinberg et al. |
| 2003/0031751 A1 | 2/2003 | Kikuchi et al. |
| 2006/0280412 A1 | 12/2006 | Varkey |
| 2007/0140622 A1 | 6/2007 | Kenison et al. |

FOREIGN PATENT DOCUMENTS

| | | |
|---|---|---|
| DE | 19858474 B4 | 12/1998 |
| GB | 1465493 A | 2/1977 |
| GB | 2426019 A | 11/2006 |
| WO | 9407650 A1 | 4/1994 |
| WO | 9628750 A1 | 9/1996 |

OTHER PUBLICATIONS

Abstract No. 2000-533743 for DE19858474B4.
Abstract No. 1998-433974 for W09628750A1.

*Primary Examiner*—Jennifer Doan
(74) *Attorney, Agent, or Firm*—Winstead PC; Daryl R. Wright; James L. Kurka (57) ABSTRACT

An apparatus for forming an optical fiber device comprising at least one optical fiber includes a mold having a forming surface, a heating source for heating the mold or the optical fiber, and an insert defining at least one optical fiber locator passage for guiding at least one optical fiber toward the forming surface. A method for forming an optical fiber device from at least one optical fiber includes the steps of heating the optical fiber or a forming surface of a mold to a temperature greater than a melting temperature of the optical fiber; advancing the optical fiber into contact with the forming surface of the mold such that a portion of the optical fiber is formed into a shape inversely corresponding to a shape of the forming surface; and withdrawing the optical fiber from the forming surface.

14 Claims, 6 Drawing Sheets

APPARATUS AND METHOD FOR FORMING AN OPTICAL FIBER DEVICE

BACKGROUND OF THE INVENTION

1. Field of the Invention

The present invention relates to forming optical fiber devices.

2. Description of Related Art

Optical fiber devices, such as optical fiber cables, are widely used in commercial and personal equipment. In many implementations, the ends of such optical fiber devices exhibit specified configurations. Conventionally, the ends of many such optical fiber devices are ground and polished to achieve the desired configurations. Generally, grinding and polishing operations are time consuming and costly. Because each optical fiber device is processed individually, inconsistencies between optical fiber devices naturally arise. These problems are exacerbated when the optical fibers of such devices being processed are small and in implementations wherein the geometric and/or dimensional characteristics of the fiber optic device end require tight tolerances.

Some optical fiber devices require that ends of two or more optical fibers be optically coupled or joined. Traditionally, the optical fibers are joined using optical resins or the like that are applied to the optical fibers. Conventional optical resins, however, are not compatible with some environments, such as high temperature environments. The optical resins may soften, deteriorate, or otherwise fail to operate properly in such environments. Moreover, the resin joining the optical fibers must be ground and polished to achieve a desired end configuration in some implementations. The grinding and polishing of resin portions that join optical fibers suffer from the same problems discussed above concerning the grinding and polishing of optical fibers.

There are many ways to form optical fiber devices that are well known in the art. However, considerable shortcomings remain.

BRIEF SUMMARY OF THE INVENTION

There is a need for an improved apparatus and method for forming optical fiber devices.

Therefore, the present invention provides an improved apparatus and method for forming an optical fiber device.

The apparatus includes a mold having a forming surface, means for heating the mold or the optical fiber or fibers comprising the optical fiber device, and an insert defining at least one optical fiber locator passage for guiding at least one optical fiber toward the forming surface.

An alternative apparatus for forming an optical fiber device is also provided. This apparatus includes a mold having a forming surface and means for heating the mold or the optical fiber or fibers comprising the optical fiber device. The apparatus further includes an insert defining at least one optical fiber locator passage for guiding at least one optical fiber toward the forming surface and a guide affixed to the mold, the guide defining a recess configured to receive the insert and an optical fiber locator passage leading from the at least one optical fiber locator passage of the insert toward the forming surface.

In another aspect, the present invention provides a method for forming an optical fiber device from at least one optical fiber. The method includes the steps of heating a forming surface of a mold to a temperature greater than a melting temperature of the at least one optical fiber; advancing the at least one optical fiber into contact with the forming surface of the mold such that a portion of the at least one optical fiber is formed into a shape inversely corresponding to a shape of the forming surface; and withdrawing the at least one optical fiber from the forming surface. Alternatively, heat may be applied directly to the optical fiber to melt it to acquire the mold shape.

The present invention provides significant advantages, including: (1) joining a plurality of optical fibers without the use of resins or the like; (2) providing a means for joining optical fibers into optical fiber devices that are capable of withstanding harsh environments, such as high temperature environments; and (3) forming ends on optical fiber devices without grinding and/or polishing the ends.

Additional features and advantages will be apparent in the following written description.

BRIEF DESCRIPTION OF THE DRAWINGS

The novel features characteristic of the invention are set forth in the appended claims. However, the invention itself, as well as a preferred mode of use and further advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figures 1, 2:
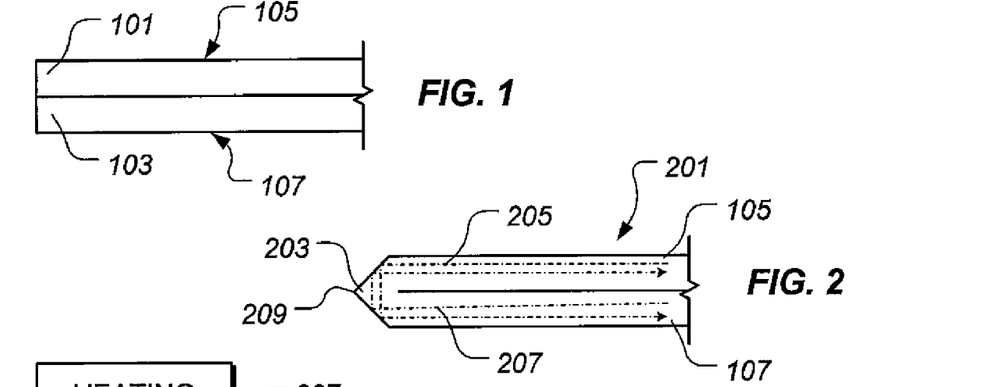
FIG. 1 is a top, plan view of a plurality of optical fibers prior to processing by the present invention.
FIG. 2 is a top plan view of the plurality of optical fibers of FIG. 1 after processing by the present invention to join the optical fibers and, thus, form an optical fiber device having a desired end configuration.

Referring to FIGS. 1 and 2, the present invention represents a method and apparatus for thermally fusing ends 101 and 103 of a plurality of optical fibers 105 and 107, respectively, to form an optical fiber device 201. During the fusing process, an end 203 of optical fiber device 201, which comprises fused ends 101 and 103 of optical fibers 105 and 107, respectively, is thermally formed into a desired configuration. In the illustrated embodiment, end 203 exhibits a configuration that provides for a light ray 205 propagating through first optical fiber 105 toward end 203 to be reflected by end 203, such that light ray 205 propagates through second optical fiber 107 away from end 203. Similarly, a light ray 207 propagating through second optical fiber 107 toward end 203 is reflected by end 203, such that light ray 207 propagates through first optical fiber 105 away from end 203. In the illustrated embodiment, end 203 includes a ridge 209 that is tangent to fibers 105 and 107. End 203, in the illustrated embodiment, exhibits a right angle with ridge 209 disposed at a vertex of the right angle. The present invention is particularly useful in the manufacture of cable and system embodiments disclosed in UK Patent GB 2 404 017 B, entitled "System for deploying double-ended distributed temperature sensing systems", which is incorporated herein by reference.

Figure 3:
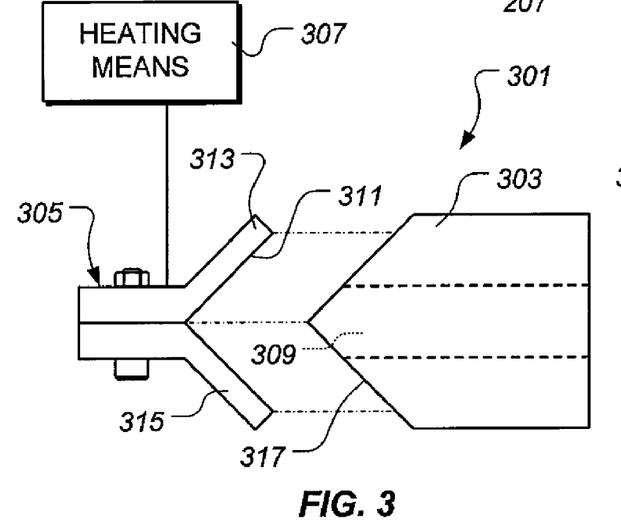
FIG. 3 is a top, plan view of a first illustrative embodiment of an apparatus according to the present invention for forming an optical fiber device.
Figure 4:
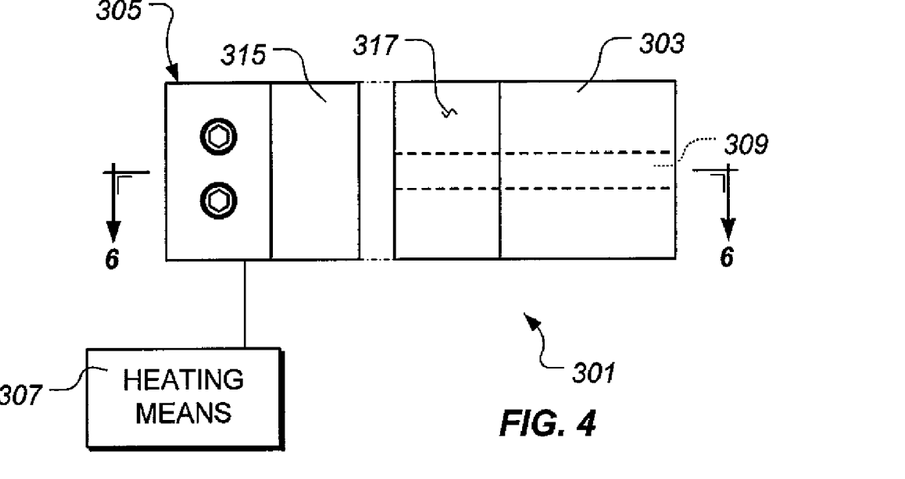
FIG. 4 is a side, elevational view of the apparatus of FIG. 3.
Figure 5:
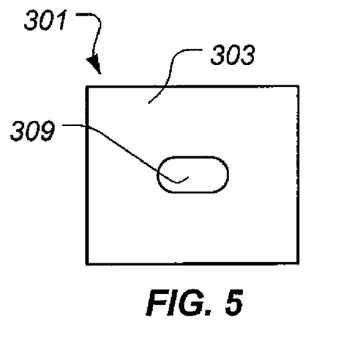
FIG. 5 is an end, elevational view of the apparatus of FIG. 3.

FIGS. 3-5 depict a first illustrative embodiment of an apparatus 301 according to the present invention for forming an optical fiber device, such as optical fiber device 201 of FIG. 2, from optical fibers, such as optical fibers 105 and 107 of FIG. 1. FIG. 3 provides a top, plan view of apparatus 301; FIG. 4 illustrates a side elevational view of apparatus 301; and FIG. 5 depicts an end, elevational view of apparatus 301 from an insert 303 end. In the illustrated embodiment, apparatus 301 comprises a mold 305 operatively associated with a heating means 307. Apparatus 301 further comprises insert 303 that mates with mold 305. Insert 303 defines an optical fiber locator passage 309 that is used to guide the optical fibers as the optical fiber device is formed by mold 305, as will be discussed in greater detail below. In the illustrated embodiment, insert 303 defines a rounded, oblong optical fiber locator passage 309 that is sized to accommodate two, side-by-side optical fibers, although other configurations are possible and are encompassed within the scope of the present invention, as will also be discussed in greater detail below.

Referring in particular to FIG. 3, mold 305 defines a forming surface 311 having a geometric configuration that inversely corresponds to the desired end configuration of the optical fiber device to be formed. In other words, if the desired end configuration of the optical fiber device protrudes from the remainder of the optical fiber device, such as in optical fiber device 201 of FIG. 2, forming surface 311 is recessed to form the protruding end of the optical fiber device. In the illustrated embodiment, forming surface 311 defines a right-angle recess for producing optical fiber device 201. Forming surface 311 exhibits a surface finish that is sufficient to form the end configuration of the optical fiber device with a desired surface finish. In other words, the surface finish of forming surface 311 is sufficient to produce a surface finish of the optical fiber device end that is within desired tolerances. It is possible, however, to use an inferior surface finish on the forming surface 311 and post-process the surface of the optical fiber device 201 to achieve the required surface finish. This post-processing may be done by abrasive or flame polishing.

In the illustrated embodiment, mold 305 comprises a plurality of portions or parts 313 and 315 that are mechanically fastened together. The use of a plurality of portions or parts may facilitate the making of the mold 305 to achieve the required tolerances. The scope of the present invention, however, is not so limited. Rather, mold 305 may comprise only a single part or portion. Moreover, even though mold 305 is illustrated in FIGS. 3-5 as comprising two portions or parts (i.e., parts 313 and 315) mechanically fastened together, mold 305 may, in alternative embodiments, comprise more than two portions or parts mechanically fastened together. Furthermore, the plurality of portions or parts (e.g., parts 313 and 315 of mold 305) may be joined together by means other than mechanical fasteners. For example, the plurality of parts may be joined together by welds. Other means for joining the plurality of portions or parts exist and are encompassed with the scope of the present invention.

Still referring in particular to FIG. 3, insert 303 includes a face 317 adapted to mate with forming surface 311 of mold 305. Preferably, the geometric configuration of face 317 inversely corresponds to the geometric configuration of forming surface 311. For example, in the illustrated embodiment, forming surface 311 of mold 305 is recessed, while face 317 of insert 303 protrudes from the remainder of insert 303 to mate with forming surface 311.

Referring now to FIGS. 3 and 4, the scope of the present invention encompasses any heating means 307 suitable for providing thermal energy to mold 305. For example, in one embodiment, heating means 307 comprises an electromagnetic heating source. Alternatively, heating means 307 may be used to apply heat directly to that part of the optical fiber or fibers to be melted or fused. This may be done by means of electrical current discharge, for example.

Mold 305 and insert 303 preferably each comprise a material exhibiting a melting point that is higher than a melting point of the optical fibers (e.g., optical fibers 105 and 107 of FIG. 1) to be formed into the optical fiber device (e.g., optical fiber device 201 of FIG. 2). In one embodiment wherein optical fibers comprising silica are to be formed into an optical fiber device, mold 305 and insert 303 comprise titanium or an alloy comprising titanium as the alloy's principal element.

FIGS. 6-9 depict cross-sectional views of apparatus 301, taken along the line 6-6 in FIG. 4, in which one particular embodiment of a method of forming an optical fiber device (e.g., optical fiber device 201 of FIG. 2) is illustrated. Optical fibers 105 and 107, also depicted in cross-section, are disposed in optical fiber locator passage 309.

Figure 6:
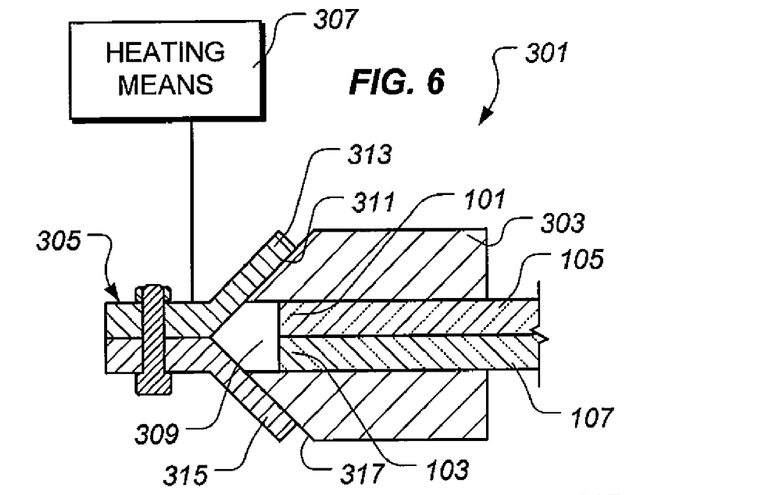
FIGS. 6-9 are cross-sectional views of the apparatus of FIG. 3, taken along the line 6-6 in FIG. 4, depicting one particular method according to the present invention of forming an optical fiber device.

Referring now to FIG. 6, heating means 307 provides thermal energy to mold 305, such that the temperature of mold 305 is equal to or greater than the melting temperature of optical fibers 105 and 107. Optical fibers 105, 107 are placed in optical fiber locator passage 309 and insert 303 is mated with mold 305. It should be noted that optical fibers 105, 107 may be placed in optical fiber locator passage 309 prior to mating insert 303 with mold 305.

Figures 7, 8:
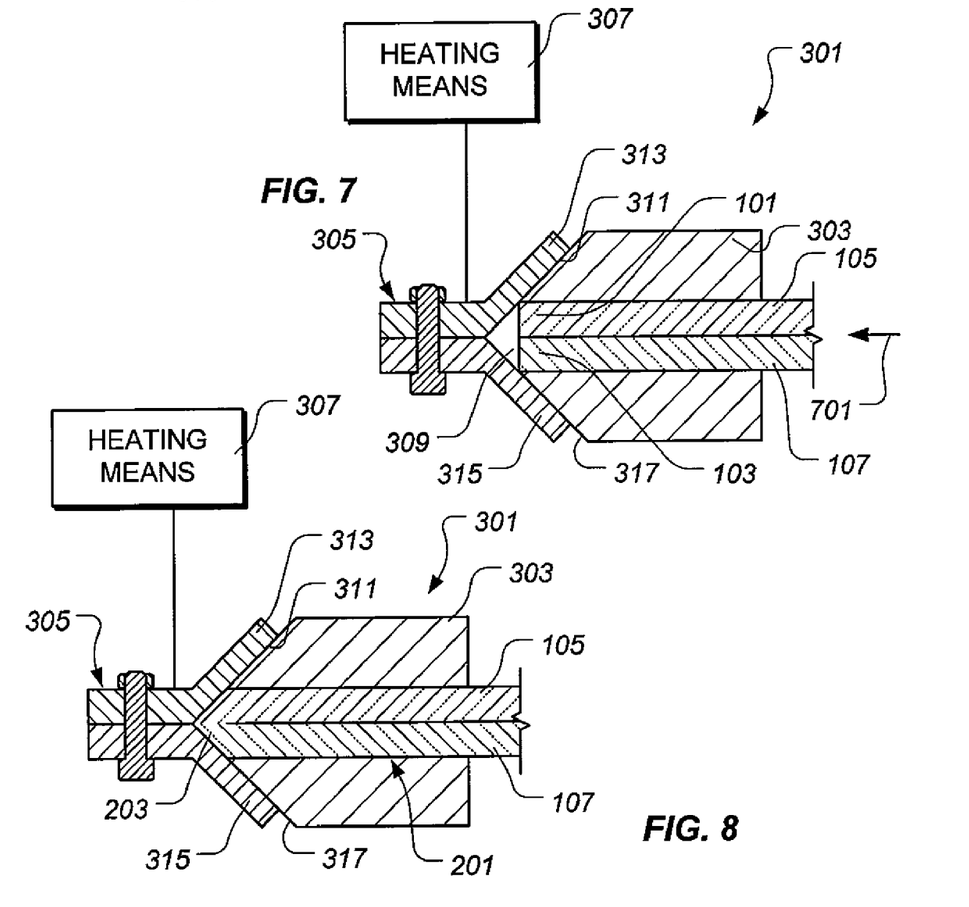

Referring now to FIG. 7, optical fibers 105 and 107 are advanced (as indicated by arrow 701) through optical fiber locator passage 309 until contact is made between forming surface 311 of mold 305 and optical fibers 105 and 107. Optical fibers 105 and 107 are further urged (as indicated by arrow 701) toward mold 305. As heat is conducted into ends 101 and 103 of optical fibers 105 and 107, respectively, portions of ends 101 and 103 melt.

Figure 9:
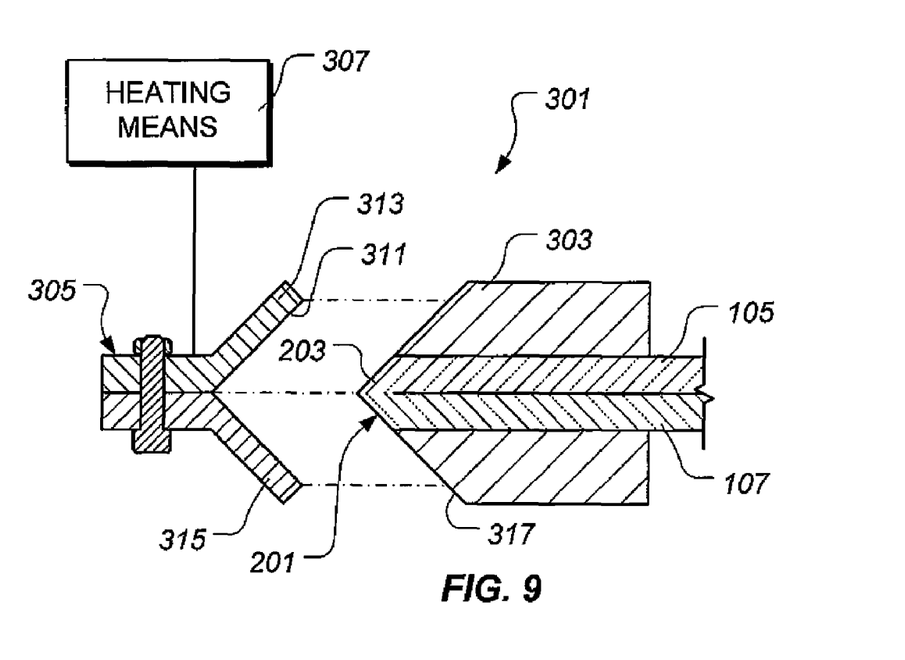

As illustrated in FIG. 8, the melted portions of ends 101 and 103 flow together, conforming to the geometric configuration of forming surface 311 of mold 305 and fusing optical fibers 105 and 107 together, forming optical fiber device 201. In a preferred embodiment, forming surface 311 of mold 305 is allowed to cool to below the melting point of optical fibers 105 and 107. Then, as depicted in FIG. 9, insert 303 is withdrawn from mold 305 and optical fiber device 201 is removed from insert 303. It should be noted that the scope of the present invention, however, encompasses a method wherein insert 303 is withdrawn from mold 305 without first cooling forming surface 311 of mold 305.

It should also be noted that the particular geometric configuration of forming surface 311 of mold 305 and the resulting geometric configuration of end 203 of optical fiber device 201 are merely exemplary. Other configurations exist and such configurations are encompassed within the scope of the present invention.

Figure 10:
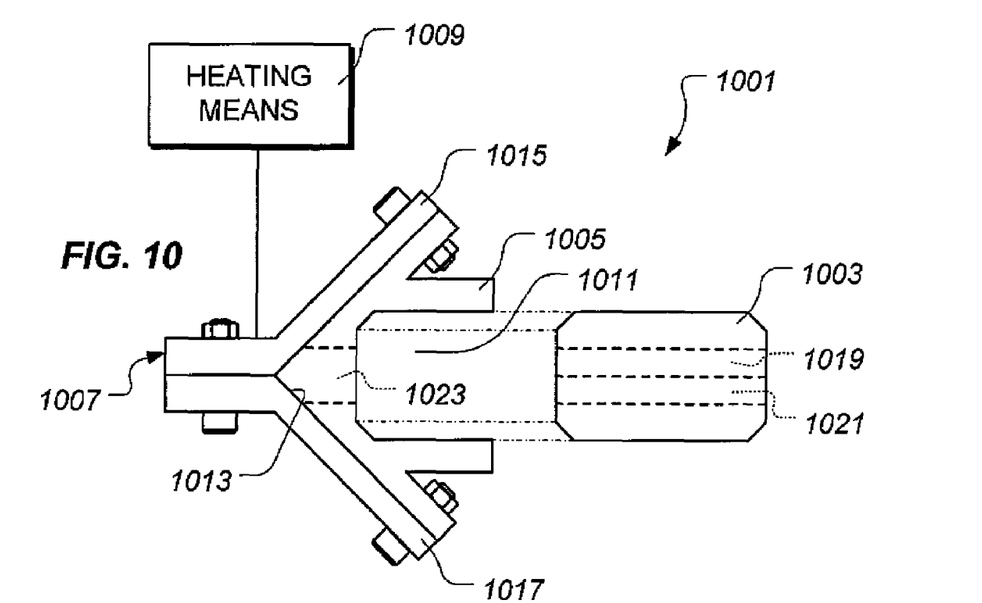
FIG. 10 is a top, plan view of a second illustrative embodiment of an apparatus according to the present invention for forming an optical fiber device.
Figure 11:
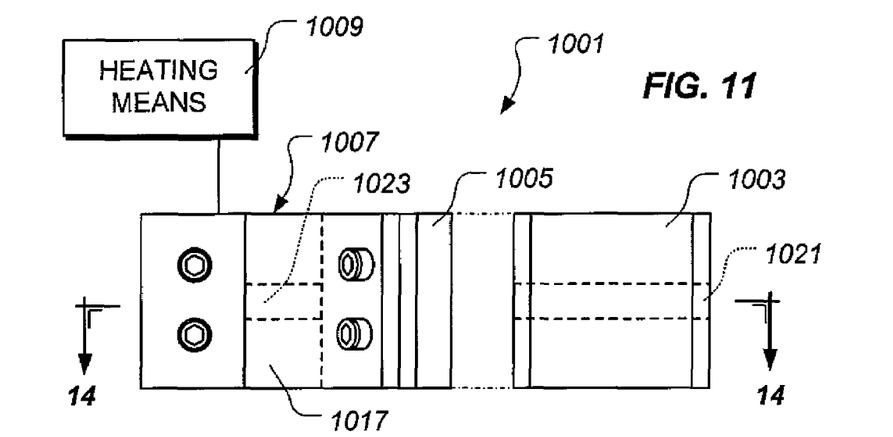
FIG. 11 is a side, elevational view of the apparatus of FIG. 10.
Figure 12:
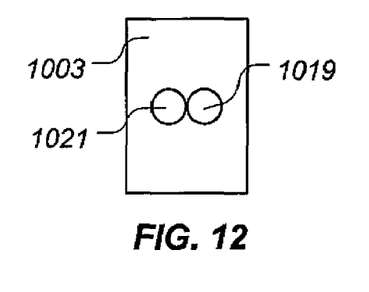
FIG. 12 is an end, elevational view of an insert of the apparatus of FIG. 10.
Figure 13:
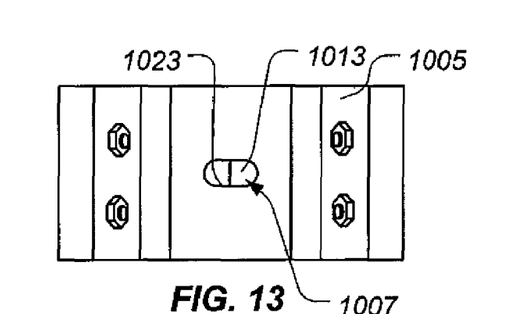
FIG. 13 is an end, elevational view of a forming assembly of the apparatus of FIG. 10.

FIGS. 10-13 depict a second illustrative embodiment of an apparatus 1001 according to the present invention for forming an optical fiber device, such as optical fiber device 201 of FIG. 2, from optical fibers, such as optical fibers 105 and 107 of FIG. 1. FIG. 10 provides a top, plan view of apparatus 1001 and FIG. 11 provides a side, elevational view of apparatus 1001. FIG. 12 is an end, elevational view of an insert 1003 of apparatus 1001. FIG. 13 is an end, elevational view of a guide 1005 and a mold 1007 of apparatus 1001. As in the embodiment of FIGS. 3-5, a heating means 1009 is operably associated with mold 1007 to provide thermal energy to mold 1007. Insert 1003 is used to guide a plurality of optical fibers (e.g., optical fibers 105 and 107 of FIG. 1) as they are thermally fused by heated mold 1007 to form an optical fiber device (e.g., optical fiber device 201 of FIG. 2) having a desired end configuration. In this embodiment, however, insert 1003 mates with guide 1005, which has a fixed spatial relationship with respect to mold 1007.

Referring now in particular to FIG. 10, guide 1005 is attached or otherwise affixed to mold 1007. Guide 1005 defines a recess 1011 that receives insert 1003, such that insert 1003 mates with guide 1005. Mold 1007 includes a forming surface 1013 having a geometric configuration that inversely corresponds to the desired end configuration of the optical fiber device to be formed, as discussed above in relation to forming surface 311 (shown in FIG. 3). In the illustrated embodiment, forming surface 1013 defines a right-angle recess for producing optical fiber device 201. Forming surface 1013 exhibits a surface finish that is sufficient to form the end configuration of the optical fiber device with a desired surface finish.

In the illustrated embodiment, mold 1007 comprises a plurality of portions or parts 1015 and 1017 that are mechanically fastened together. As discussed above in relation to mold 305 of FIG. 3, mold 1007 may comprise only a single part or portion or may comprise any suitable number of portions or parts. Moreover, parts 1015 and 1017 may be joined together by means other than mechanical fasteners, such as by welds. Furthermore, while FIGS. 10, 11, and 13 illustrate guide 1005 being mechanically attached to mold 1007, the scope of the present invention encompasses embodiments wherein guide 1005 is integral with mold 1007 or is attached to mold 1007 by other means, such as by welds.

As best illustrated in FIG. 12, insert 1003 defines a plurality of optical fiber locator passages 1019 and 1021, corresponding to the plurality of optical fibers (e.g., optical fibers 105 and 107 of FIG. 1) being joined into the optical fiber device (e.g., optical fiber device 201 of FIG. 2). As will be discussed in greater detail below, optical fibers are disposed in optical fiber locator passages 1019 and 1021, along which the optical fibers are guided as the optical fiber device is formed by mold 1007. Alternatively, insert 1003 defines a single optical fiber locator passage, such as optical fiber locator passage 309 of FIG. 3. It should be noted that, in the embodiment of FIGS. 3-5, insert 303 may alternatively define a plurality of optical fiber locator passages (e.g., optical fiber locator passages 1019 and 1021, corresponding to the plurality of optical fibers being formed into an optical fiber device.

Referring now to FIG. 13, guide 1005 defines an optical fiber locator passage 1023 leading to forming surface 1013 of mold 1007. Once insert 1003 is mated with guide 1005, optical fibers are advanced through optical fiber locator passages 1019 and 1021 of insert 1003 and through optical fiber locator passage 1023 of guide 1005 to forming surface 1013 of mold 1007, as will be discussed in greater detail below.

Insert 1003, guide 1005, and mold 1007 preferably each comprise a material exhibiting a melting point that is higher than a melting point of the optical fibers (e.g., optical fibers 105 and 107 of FIG. 1) to be formed into the optical fiber device (e.g., optical fiber device 201 of FIG. 2). In one embodiment wherein optical fibers comprising silica are to be formed into an optical fiber device, insert 1003, guide 1005, and mold 1007 each comprise titanium or an alloy comprising titanium as the alloy's principal element.

FIGS. 14-17 depict cross-sectional views of apparatus 1001, taken along the line 14-14 in FIG. 11, in which one particular embodiment of a method of forming an optical fiber device (e.g., optical fiber device 201 of FIG. 2) is illustrated. Optical fibers 105 and 107, also depicted in cross-section, are disposed in optical fiber locator passages 1019 and 1021.

Figure 14:
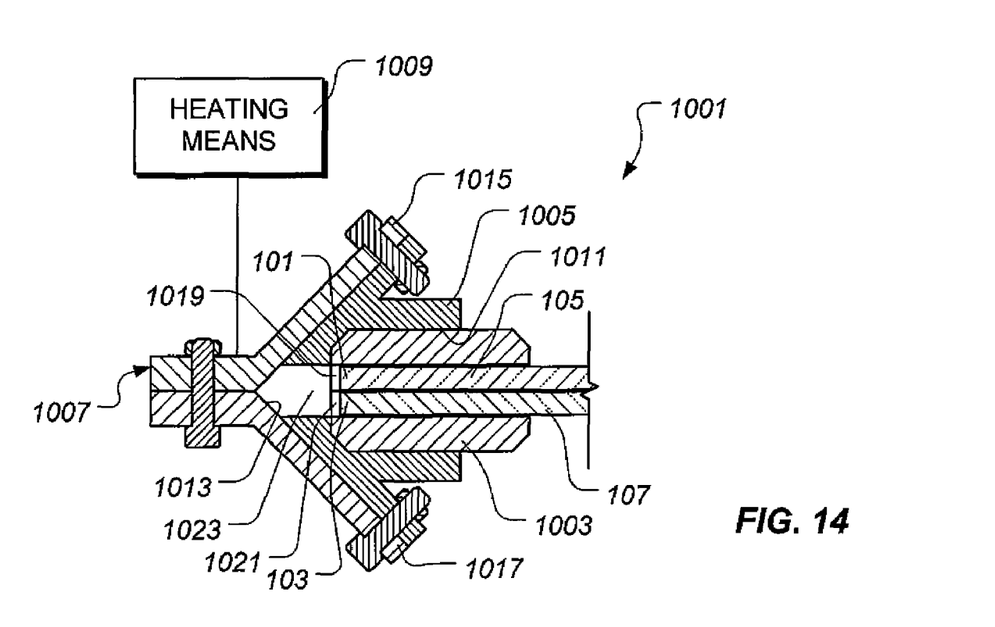
FIGS. 14-17 are cross-sectional views of the apparatus of FIG. 10, taken along the line 14-14 of FIG. 11, illustrating a method according to the present invention for forming an optical fiber device.

Referring now to FIG. 14, heating means 1009 provides thermal energy to mold 1007, such that mold 1007 is heated to a temperature equal to or greater than the melting temperature of optical fibers 105 and 107. Optical fibers 105, 107 are placed in optical fiber locator passages 1019 and 1021 and insert 1003 is mated with guide 1005. It should be noted that insert 1003 may be mated with guide 1005 prior to placing optical fibers 105, 107 in optical fiber locator passages 1019, 1021, respectively.

Figure 15:
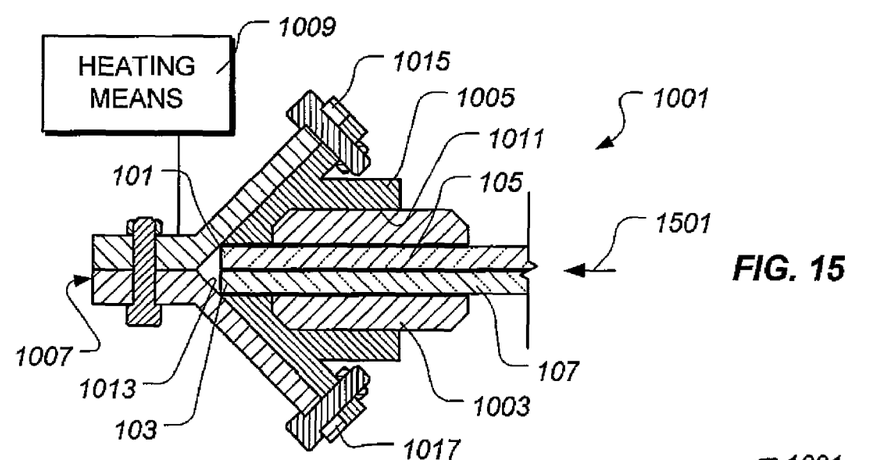

Referring now to FIG. 15, optical fibers 105 and 107 are advanced (as indicated by arrow 1501) through optical fiber locator passages 1019 and 1021 until contact is made between forming surface 1013 of mold 1007 and optical fibers 105 and 107. Optical fibers 105 and 107 are further urged (as indicated by arrow 1501) toward mold 1007. As heat is conducted from mold 1007 into ends 101 and 103 of optical fibers 105 and 107, respectively, portions of ends 101 and 103 melt.

Figure 16:
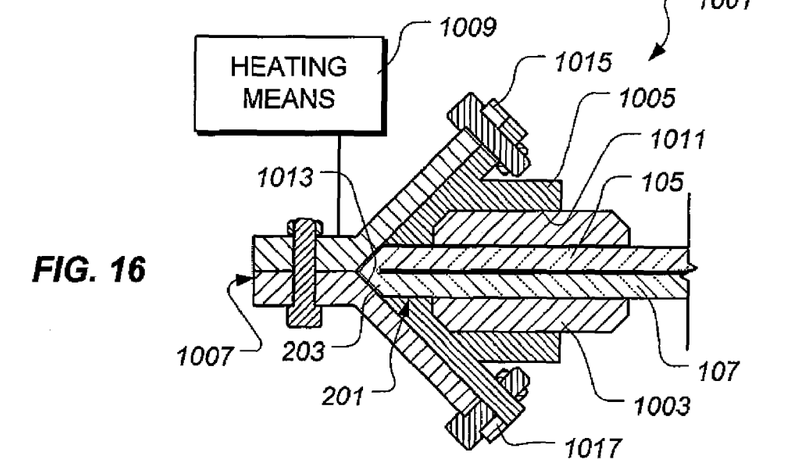
Figure 17:
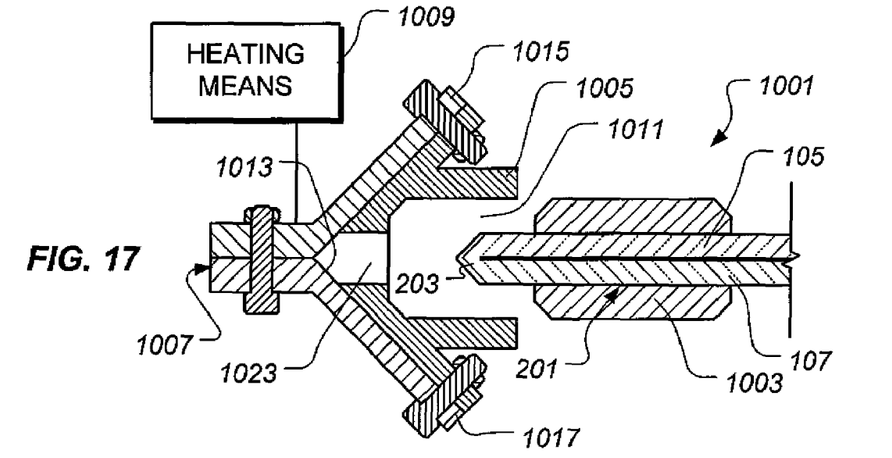

As illustrated in FIG. 16, the melted portions of ends 101 and 103 flow together, conforming to the geometric configuration of forming surface 1013 of mold 1007 and fusing optical fibers 105 and 107 together, forming optical fiber device 201. In a preferred embodiment, mold 1007 is allowed to cool to below the melting point of optical fibers 105 and 107. Then, as depicted in FIG. 17, insert 1003 is withdrawn from guide 1005 and optical fiber device 201 is removed from insert 1003. It should be noted that the scope of the present invention, however, encompasses a method wherein insert 1003 is withdrawn from guide 1005 without first cooling mold 1007.

It should be noted that the particular geometric configuration of forming surface 1013 of mold 1007 and the resulting geometric configuration of end 203 of optical fiber device 201 are merely exemplary. Other configurations exist and such configurations are encompassed within the scope of the present invention.

Figure 18:
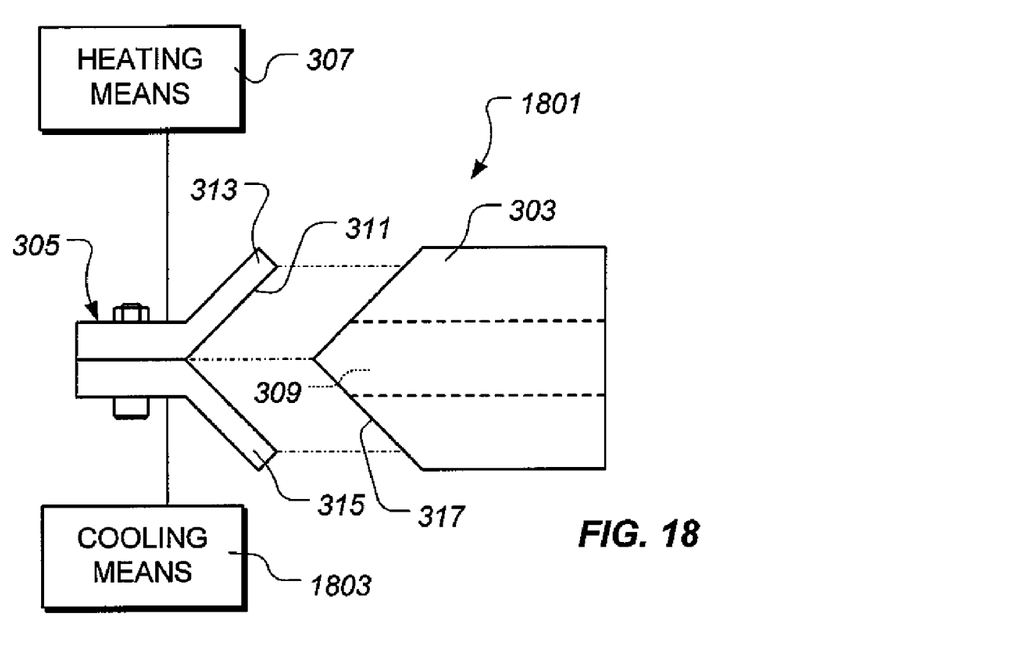
FIG. 18 is a top, plan view of a third illustrative embodiment of an apparatus according to the present invention for forming an optical fiber device.

FIG. 18 depicts a third illustrative embodiment of an apparatus 1801 according to the present invention for forming an optical fiber device, such as optical fiber device 201 of FIG. 2, from a plurality of optical fibers, such as optical fibers 105 and 107 of FIG. 1. Apparatus 1801 corresponds to apparatus 301 of FIG. 3, except that apparatus 1801 includes a cooling means 1803 operatively associated with mold 305. Cooling means 1803 may comprise any suitable means for cooling mold 305 from a temperature above the melting temperature of the optical fibers being formed into the optical fiber device to a temperature below the melting temperature of the optical fibers. In various embodiments, cooling means 1803 may comprise a fan urging air at an ambient temperature or below over mold 305, a refrigerant system for cooling mold 305, or the like. Moreover, the scope of the present invention encompasses a method, corresponding to the method described above in relation to FIGS. 6-9, further including the step of cooling mold 305 with cooling means 1903.

Figure 19:
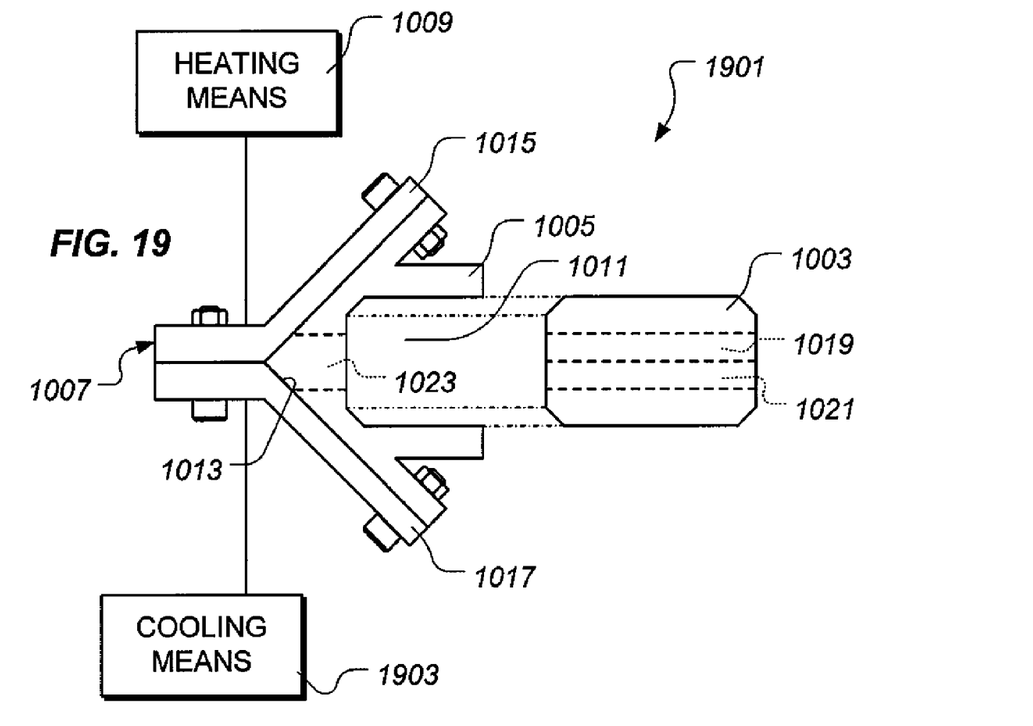
FIG. 19 is a top, plan view of a fourth illustrative embodiment of an apparatus according to the present invention for forming an optical fiber device.

FIG. 19 depicts a fourth illustrative embodiment of an apparatus 1901 according to the present invention for forming an optical fiber device, such as optical fiber device 201 of FIG. 2, from a plurality of optical fibers, such as optical fibers 105 and 107 of FIG. 1. Apparatus 1901 corresponds to apparatus 1001 of FIG. 10, except that apparatus 1901 includes a cooling means 1903, corresponding to cooling means 1803 described above, operatively associated with mold 1007. Moreover, the scope of the present invention encompasses a method, corresponding to the method described above in relation to FIGS. 15-17, further including the step of cooling mold 1007 with cooling means 1803.

It should be noted that, while the drawings and the corresponding description provided above disclose various embodiments of the present invention operable to fuse a plurality of optical fibers into an optical fiber device having a desired end configuration, the scope of the present invention is not so limited. Rather, the apparatus and method of the present invention may be used to thermally form a desired end configuration on a single optical fiber.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Although the present invention is shown in a limited number of forms, it is not limited to just these forms, but is amenable to various changes and modifications.

What is claimed is:

1. A method for forming an optical fiber device from at least one optical fiber, comprising the steps of:
    heating the at least one optical fiber or a forming surface of a mold to a temperature greater than a melting temperature of the at least one optical fiber;
    advancing the at least one optical fiber into contact with the forming surface of the mold, such that a portion of the at least one optical fiber is formed into a shape inversely corresponding to a shape of the forming surface;
    withdrawing the at least one optical fiber from the forming surface;
    wherein the at least one optical fiber comprises a plurality of optical fibers; and
    wherein the step of advancing the plurality of optical fibers further comprises fusing portions of the plurality of optical fibers together via a lap joint, such that the fused portions are formed into a shape inversely corresponding to the shape of the forming surface.

2. The method according to claim 1, further comprising the step of halting the heating of the forming surface of the mold such that a temperature of the formed portions of the plurality of optical fibers falls below the melting temperature of the at least one optical fiber prior to the step of withdrawing the plurality of optical fibers from the forming surface.

3. The method according to claim 1, further comprising the step of cooling the forming surface of the mold to a temperature below the melting temperature of the plurality of optical fibers prior to the step of withdrawing the plurality of optical fibers from the forming surface.

4. The method according to claim 1, wherein the step of advancing the plurality of optical fibers is accomplished by advancing the plurality of optical fibers through an optical fiber locator passage defined by an insert mated with the mold.

5. The method according to claim 1, wherein the step of advancing the plurality of optical fibers is accomplished by advancing the plurality of optical fibers through an optical fiber locator passage defined by an insert mated with a guide affixed to the mold.

6. The method according to claim 1, wherein the fused portions of the plurality of optical fibers define a right-angled end.

7. A method for forming an optical fiber device from at least one optical fiber, comprising the steps of:
    heating the at least one optical fiber or a forming surface of a mold to a temperature greater than a melting temperature of the at least one optical fiber;
    advancing the at least one optical fiber into contact with the forming surface of the mold, such that a portion of the at least one optical fiber is formed into a shape inversely corresponding to a shape of the forming surface; and
    withdrawing the at least one optical fiber from the forming surface;
    wherein the step of advancing the at least one optical fiber is accomplished by advancing the at least one optical fiber through an optical fiber locator passage defined by an insert mated with the mold.

8. The method according to claim 7, further comprising the step of halting the heating of the forming surface of the mold such that a temperature of the formed portion of the at least one optical fiber falls below the melting temperature of the at least one optical fiber prior to the step of withdrawing the at least one optical fiber from the forming surface.

9. The method according to claim 7, further comprising the step of cooling the forming surface of the mold to a temperature below the melting temperature of the at least one optical fiber prior to the step of withdrawing the at least one optical fiber from the forming surface.

10. The method, according to claim 7, wherein the fused portion of the at least one optical fiber defines a right-angled end.

11. A method for forming an optical fiber device from at least one optical fiber, comprising the steps of:
    heating the at least one optical fiber or a forming surface of a mold to a temperature greater than a melting temperature of the at least one optical fiber;

advancing the at least one optical fiber into contact with the forming surface of the mold, such that a portion of the at least one optical fiber is formed into a shape inversely corresponding to a shape of the forming surface; and withdrawing the at least one optical fiber from the forming surface;

wherein the step of advancing the at least one optical fiber is accomplished by advancing the at least one optical fiber through an optical fiber locator passage defined by an insert mated with a guide affixed to the mold.

12. The method according to claim 11, further comprising the step of halting the heating of the forming surface of the mold such that a temperature of the formed portion of the at least one optical fiber falls below the melting temperature of the at least one optical fiber prior to the step of withdrawing the at least one optical fiber from the forming surface.

13. The method according to claim 11, further comprising the step of cooling the forming surface of the mold to a temperature below the melting temperature of the at least one optical fiber prior to the step of withdrawing the at least one optical fiber from the forming surface.

14. The method, according to claim 11, wherein the fused portion of the at least one optical fiber defines a right-angled end.

* * * * *